United States Patent
Bustos Garcia et al.

(10) Patent No.: US 8,240,706 B2
(45) Date of Patent: Aug. 14, 2012

(54) AIRBAG ARRANGED ON THE VEHICLE ROOF

(75) Inventors: Alfonso Bustos Garcia, Valladolid (ES); Alfredo Gonzalo López, Valladolid (ES); Jean-Christophe Peyre, Valladolid (ES)

(73) Assignee: Dalphi Metal Espana, S.A., Madrid (ES)

( * ) Notice: Subject to any disclaimer, the term of this patent is extended or adjusted under 35 U.S.C. 154(b) by 525 days.

(21) Appl. No.: 11/989,893

(22) PCT Filed: Aug. 2, 2005

(86) PCT No.: PCT/EP2005/053755
§ 371 (c)(1),
(2), (4) Date: Apr. 1, 2010

(87) PCT Pub. No.: WO2007/014581
PCT Pub. Date: Feb. 8, 2007

(65) Prior Publication Data
US 2010/0225096 A1 Sep. 9, 2010

(51) Int. Cl.
*B60R 21/213* (2011.01)
*B60R 21/214* (2011.01)
(52) U.S. Cl. .................... 280/730.1; 280/728.2
(58) Field of Classification Search ............... 280/728.1, 280/728.2, 728.3, 730.1, 730.2
See application file for complete search history.

(56) References Cited

U.S. PATENT DOCUMENTS

| 5,772,238 | A | * | 6/1998 | Breed et al. | 280/728.2 |
|---|---|---|---|---|---|
| 5,988,735 | A | * | 11/1999 | Muller | 296/214 |
| 6,189,960 | B1 | * | 2/2001 | Mumura et al. | 296/212 |
| 6,224,087 | B1 | * | 5/2001 | Stutz et al. | 280/728.2 |
| 6,227,561 | B1 | * | 5/2001 | Jost et al. | 280/730.2 |
| 6,431,586 | B1 | * | 8/2002 | Eyrainer et al. | 280/730.1 |
| 6,588,793 | B2 | * | 7/2003 | Rose | 280/728.2 |
| 6,817,626 | B2 | * | 11/2004 | Boll et al. | 280/730.1 |
| 6,913,280 | B2 | * | 7/2005 | Dominissini et al. | 280/728.2 |
| 6,948,736 | B2 | * | 9/2005 | DePottey et al. | 280/728.2 |
| 7,152,873 | B2 | * | 12/2006 | Peng et al. | 280/730.1 |
| 7,213,835 | B2 | * | 5/2007 | Totsuka et al. | 280/730.2 |
| 7,237,798 | B2 | * | 7/2007 | Mori et al. | 280/730.1 |
| 7,290,798 | B2 | * | 11/2007 | Mori et al. | 280/743.1 |
| 7,364,185 | B2 | * | 4/2008 | Mori et al. | 280/730.1 |
| 2003/0052476 | A1 | | 3/2003 | Rose | |
| 2004/0090050 | A1 | | 5/2004 | Dominissini et al. | |
| 2004/0188991 | A1 | | 9/2004 | Schneider et al. | |
| 2004/0251668 | A1 | | 12/2004 | Schneider et al. | |

* cited by examiner

*Primary Examiner* — Ruth Ilan
*Assistant Examiner* — Barry Gooden, Jr.
(74) *Attorney, Agent, or Firm* — Ladas & Parry LLP

(57) ABSTRACT

A airbag arranged on a vehicle roof for protecting the occupant located under which includes a cushion (11), a gas generator (13) and an outer cover (17) with a weakened area (45) to allow cushion (11) exit, further comprising an inner casing (23) including a fixing area (31) for fixing it to a vehicle roof header (29), an area (33) for housing the generator (33) and a diffusion channel (35) for diffusing the gas into the cushion (11), having a first portion (51) of the cushion (11) located along the inner contour of the inner casing (33) such that the gas is received in the initial area of the diffusion channel (35) and a second portion (53) located, in the folded state, in an enclosure demarcated by at least portions of the inner casing (33) and outer cover (17).

7 Claims, 4 Drawing Sheets

AIRBAG ARRANGED ON THE VEHICLE ROOF

FIELD OF THE INVENTION

The present invention refers to an airbag arranged on the vehicle roof intended for restraining the occupant located in front of the airbag, through a programmed deployment, being supported in pre-established portions of the vehicle which in the case of an occupant of the front area would be the windshield and the dashboard.

BACKGROUND OF THE INVENTION

A recent demand in the automotive industry is the replacement of airbags traditionally located in the vehicle steering wheel and dashboard to protect its front seat occupants from frontal impacts with airbags arranged on the vehicle roof, although commercial vehicles in which the replacement of the steering wheel airbag with an airbag arranged on the roof has been carried out are still not known.

Therefore it is demanded to free up the space occupied by an airbag in the steering wheel and dashboard in order to be able to use it for other purposes, but their replacement with airbags arranged on the roof has several difficulties in achieving similar functions.

In this sense several proposals are known in the prior art, particularly the following ones.

U.S. patent application 2004/0251668 discloses a valid deployment method for airbags arranged on the roof intended to protect the vehicle driver, allowing control of the cushion deployment path and improving its performance in "out of position" (OOP) cases.

U.S. patent application 2004/0090050 discloses a system of anchoring an airbag to the roof header in an environment including the roof headliner, central console and sun visors. The roof headliner is anchored to the roof header through a frangible screw which, when it breaks in deployment, acts as a cushion exit port. The roof headliner is secured to the roof header through a tether preventing it from coming loose during deployment. Anchoring of the sun visor is carried out through a visible plastic header that does not move during deployment.

Despite the existence of solutions such as those mentioned, the automotive industry requires roof airbags offering new solutions for two of their main drawbacks: cushion deployment path control and fixing of its different components to the roof. The present invention focuses on this requirement.

SUMMARY OF THE INVENTION

The present invention proposes an airbag arranged on a vehicle roof for protecting the occupant located under it which, following the known art, includes a cushion, a gas generator which supplies the necessary gas to the cushion when an impact occurs so that it is inflated and deployed in front of the occupant, and an outer cover with a weakened area to allow cushion exit.

According to the invention the airbag has the following basic features:

The airbag further comprises an inner casing including a fixing area for fixing it to a vehicle roof header, an area for housing the generator and a diffusion channel for diffusing the gas into the cushion.

A first portion of the cushion is located along the inner contour of the inner casing such that the gas is received in the area of the diffusion channel and a second portion is located, in the folded state, in an enclosure demarcated by at least portions of the inner casing and outer cover.

The weakened area of the outer cover is located in an enclosure close to the end area of the gas diffusion channel.

One difference of the airbag according to the invention with respect to roof airbags known in the art is the presence of the diffusion channel allowing guiding the gas flow to the inside of the cushion, allowing controlled cushion filling, limiting the possibility that the cushion could be filled in the area where it is initially folded. Guiding of the gas flow makes cushion deployment correct without it pulling off the roof headliner. Deformations in areas surrounding the airbag (headliners, sun visor . . . ) are thereby reduced and the projection of particles towards the occupant is prevented.

An advantage of the present invention is that it offers an alternative solution to the airbag located in the dashboard for protecting the vehicle passenger, allowing improved appearance, function and ergonomics.

Another advantage is that the airbag according to the invention is functionally compatible with a wide range of constructive vehicle architectures: roof header area, headliner, windshield, sun visor, etc.

Another advantage is that cushion guiding and deployment are improved as a result of the diffusion channel.

Another advantage is the flexibility and ease of production line assembly of the airbag on the vehicle roof.

Another advantage is that it improves performance in "out of position" (OOP) cases.

Another advantage is that it reduces the risk of hitting the occupant during cushion deployment since the cushion is not deployed directly towards the occupant, as occurs in the case of airbags located in the dashboard.

Another advantage is that it can be used for occupants of both the front area and the rear area of the vehicle since the only relevant difference is in relation to its different position in each case.

Other features and advantages of the present invention will be understood from the following detailed description of an illustrative and by no means limiting embodiment of its object in relation to the attached drawings.

DETAILED DESCRIPTION OF THE INVENTION

A first embodiment for the present invention for an airbag intended to protect an occupant in the front area of the vehicle will be described below.

Figure 1:
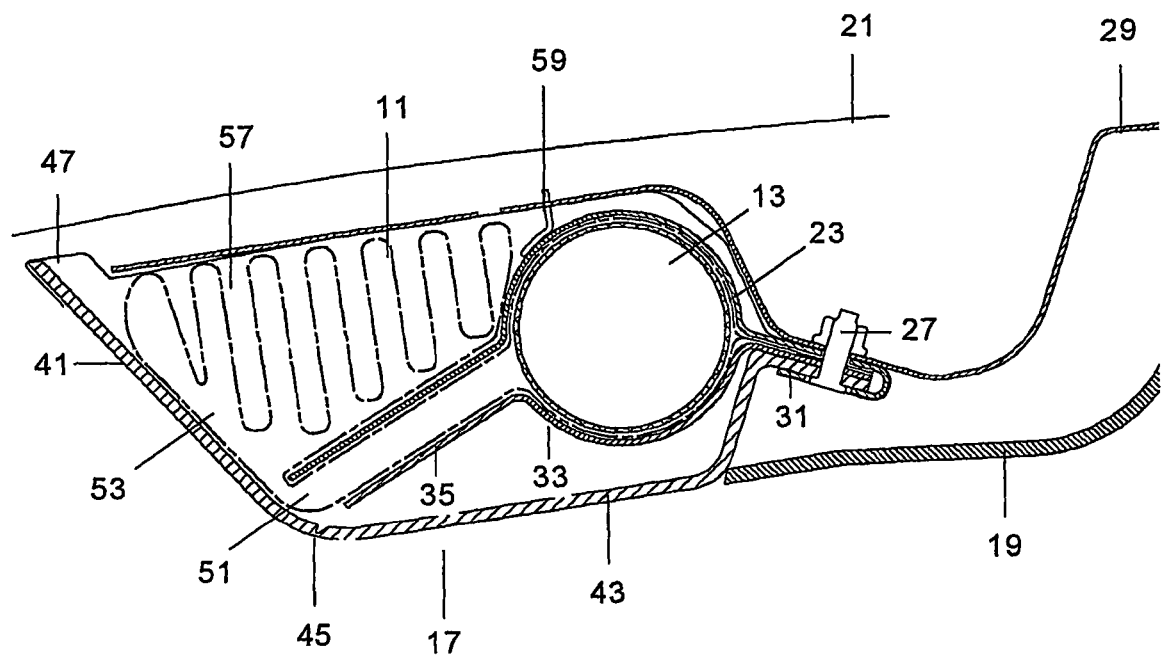
FIGS. 1 and 2 show side sectional views of an airbag according to a first embodiment of the present invention with the cushion folded and deployed, respectively.
Figure 2:
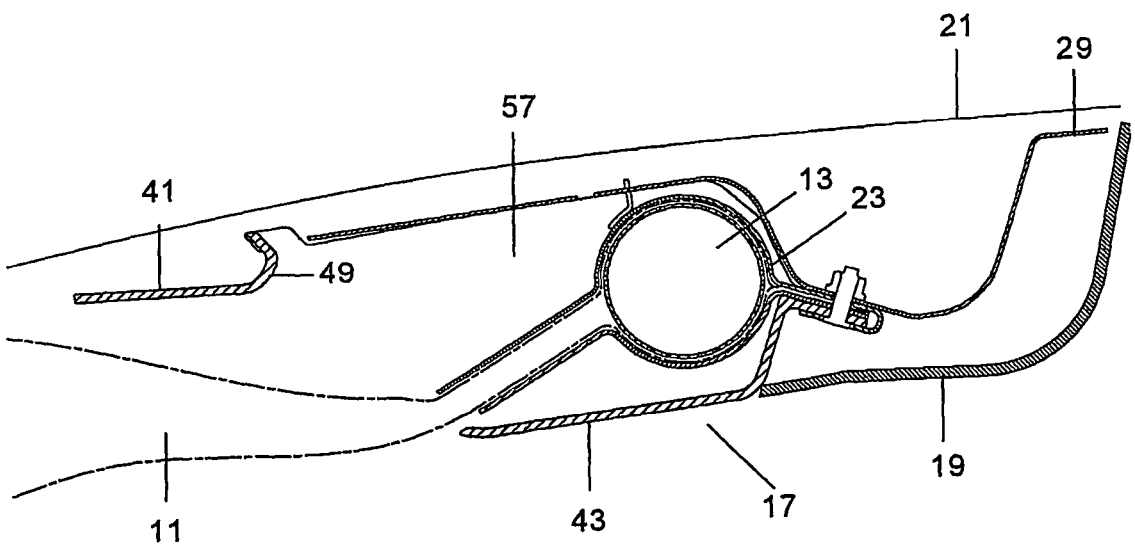

The airbag is arranged on the area of the roof 21 of the vehicle, comprised between the front header 29 and the windshield 61, and its components are located inside the cover 17 which, as shown in FIGS. 1 and 2, is visible from inside the vehicle. It could also be disguised by means of a cover giving it a similar appearance to that of the headliner 19. The airbag includes the cushion 11, the gas generator 13, the inner casing 23, the cover 17 divided into a front portion 41 and a base portion 43, separated by the weakened area 45, and the sleeve 47.

The casing 23 is formed by two flanges of a rigid material, for example metal flanges (steel, aluminum, magnesium and alloys thereof), plastic flanges, configured in three different areas: a fixing area 31 for fixing it to the front roof header 29, an area 33 for housing the generator 13 and a gas diffusion channel 35.

The sleeve 47 is useful in protecting the cushion 11 and is made of a suitable flexible material such as Tyvek® or a thin plastic sheet.

The first portion 51 of the cushion 11 is located along the inner contour of the inner casing 23, such that the gas is received in the initial area of the diffusion channel 35, and the second portion 53 is located in the folded state in an enclosure 57 demarcated by part of the inner casing 23, by the front area 41 of the outer cover 17 and by part of the roof header 29.

The diffusion channel 35 allows guiding and conditioning the gas flow from the outlet of the generator 13 towards the cushion 11 in the required direction, according to the specific architecture of each vehicle. As a result of the location of the cushion 11 inside the inner casing 33 and its subsequent folded configuration in the enclosure 57, placing a single layer of fabric of the cushion 11 on the end of the diffusion channel 35 is achieved, facilitating its inflating process.

As a result of the foregoing cushion 11 deployment and filling in the optimal direction is achieved in collaboration with the weakened area 45 of the cover 17 which must be close to the end area of the diffusion channel 35. This configuration allows reducing aggressiveness with respect to the surrounding parts of the vehicle, such as the sun visor (not shown) and roof headliner 19, reducing the risk of projection of parts from the surrounding area towards the occupant.

Fixing the airbag to the vehicle roof header 29 is carried out through the structural linkage 27 and the preposition and fixing element 59 which may consist of a hook introduced through an opening in the roof header 29 and is guided through a groove to a stop. Correct fixing of all the airbag elements is thus assured.

During deployment the cushion 11 presses against the front portion 41 of the cover 17 which is separated from the other portion 43 upon breaking in the weakened area 45. The front portion 41 includes a hinge 49 facilitating cushion deployment.

Figure 3:
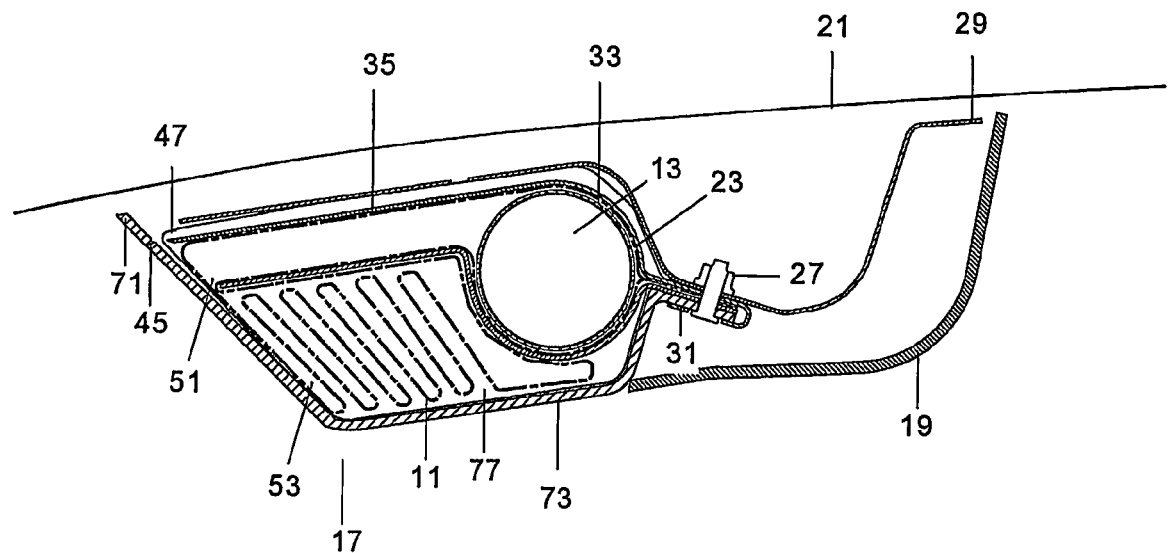
FIGS. 3 and 4 show side sectional views of an airbag according to a second embodiment of the present invention with the cushion folded and deployed, respectively.
Figure 4:
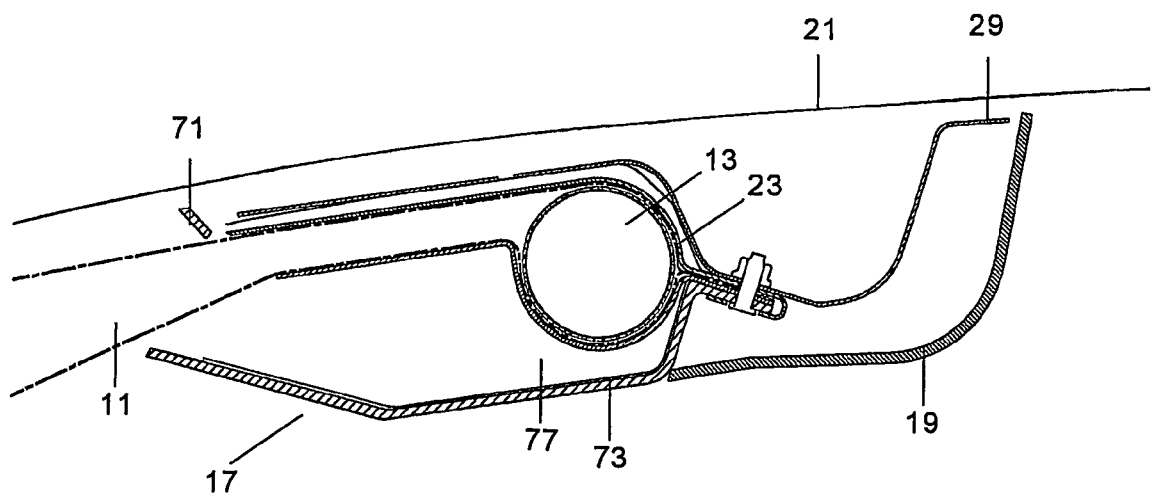

In a second embodiment of the invention, shown in FIGS. 3 and 4, the diffusion channel 35 is located close and parallel to the roof header 29 and the second portion 53 of the cushion is located in the enclosure 77 located under the diffusion channel 35. The outer cover 17 includes two portions 71, 73 separated by the weakened area 45, the larger portion 73 being of a size that is very close to the whole of the outer cover 17, demarcating the enclosure 77. As will be well understood by a person skilled in the art, the functions of the airbag according to this embodiment are similar to those of the airbag of the first embodiment, therefore any further explanation is unnecessary.

In the embodiments just described, the outer cover 17 is fixed to the inner casing 23 forming part of the airbag module that would be supplied to the automobile manufacturer for its assembly in the vehicle.

Figure 5:
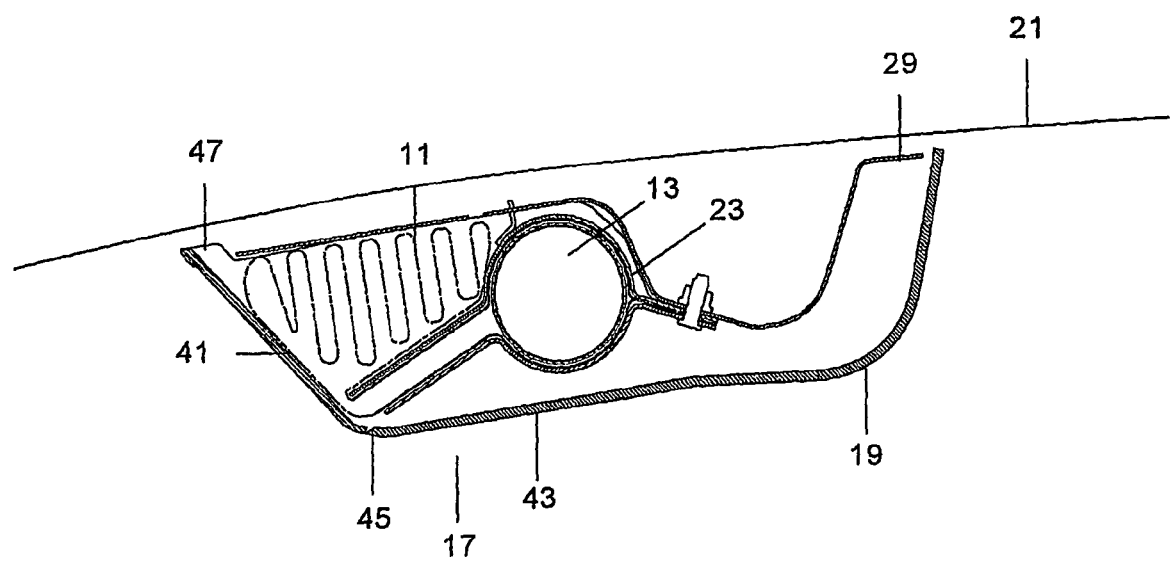
FIGS. 5 and 6 show side sectional views of an airbag with the cushion folded, showing a variant of the first and second embodiments in which the outer cover is part of the vehicle roof headliner.
Figure 6:
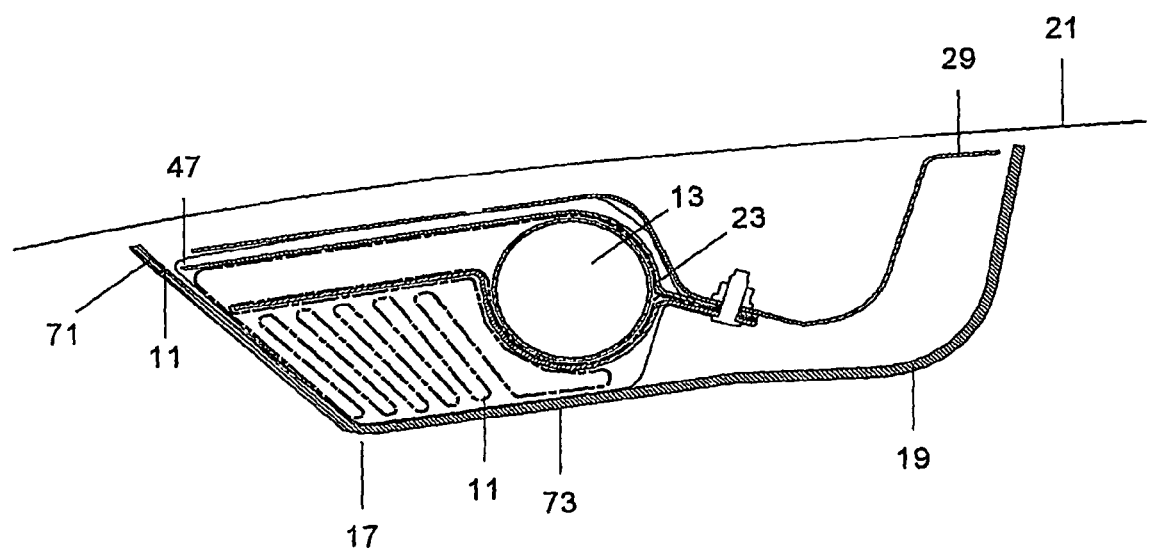
Figure 7:
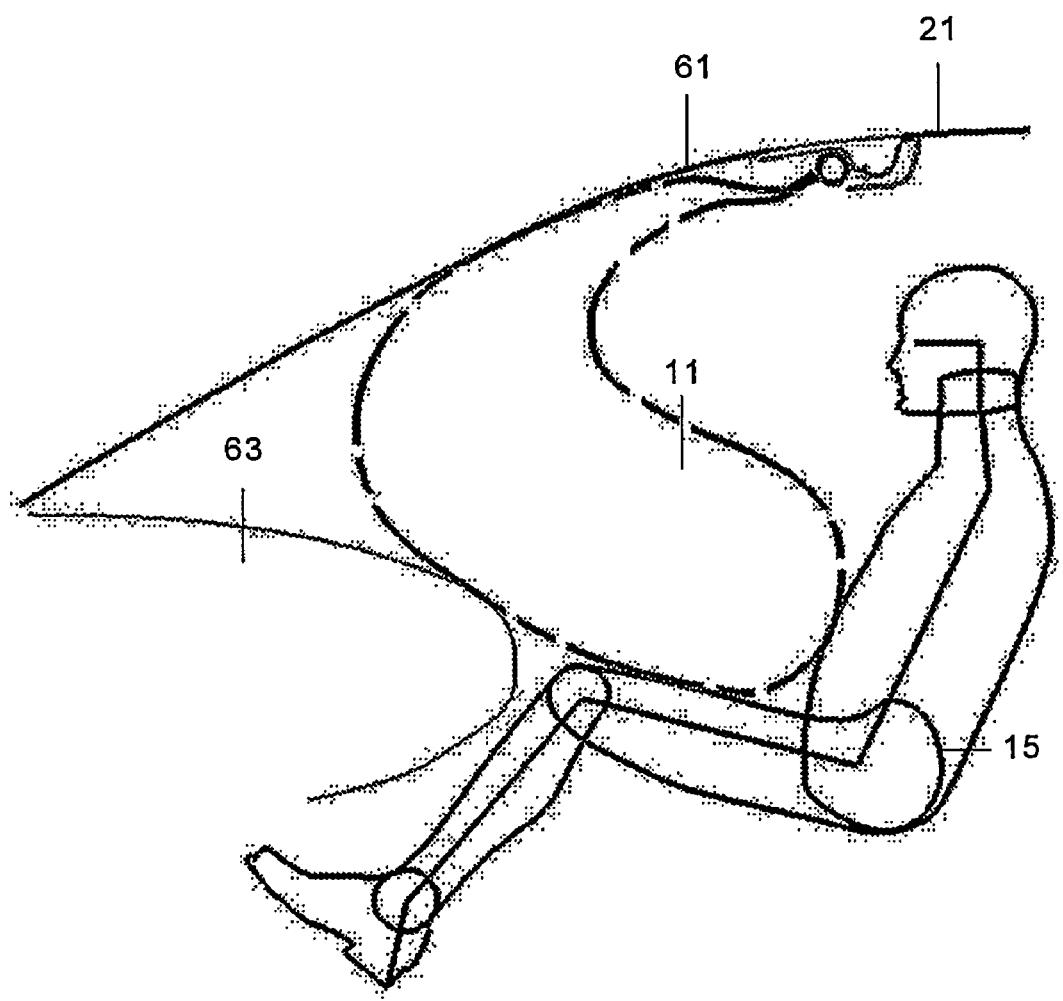
FIG. 7 shows an airbag according to the invention protecting a vehicle occupant located in the front area.

In the variant of these embodiments shown in FIGS. 5 and 6, the outer cover 17 is part of the vehicle headliner 19. In this case the airbag module would be supplied to the automobile manufacturer without the outer cover 17, having only the thin plastic or Tyvek® 47 sleeve as the single protection for the purpose of handling the folded cushion during transport to the assembly line. The manufacture, assembly and fixing of the vehicle headliner 19 would be the responsibility of the automobile manufacturer. Nevertheless, its design in portion 17 which would act as a cover for the airbag, requires certain minimum specifications of a weakened break line and hinge effect located in variable positions according to outlet direction of the gases of the inner casing 23.

In all the airbag embodiments described, once the cushion 11 is deployed it is located in front of the occupant 15, supported on the windshield 61 and dashboard 63. The represented cushion geometry may vary, being adapted to the specific retention requirements in each vehicle configuration.

Although several embodiments of the invention have been described and represented it is obvious that modifications comprised within the scope thereof may be introduced in the invention, the scope not being considered limited to said embodiments but to the content of the following claims.

The invention claimed is:

1. An airbag arranged on a roof (21) of a vehicle for protecting an occupant (15) located under it, the airbag comprising a cushion (11), a gas generator (13) which supplies gas to the cushion (11) when an impact occurs in order to inflate and deploy the cushion in front of the occupant (15), and an outer cover (17) including a front portion and a base portion separated by a weakened area (45) for exit of the cushion (11),
   an inner casing (23) including a fixing area (31) for fixing the cushion (11) to a vehicle roof header (29), an area (33) for housing the generator (13) and a diffusion channel (35) for diffusing the gas into the cushion (11);
   wherein a first portion (51) of the cushion (11) is disposed along an inner contour of the inner casing (23) such that the gas is received in an initial area of the diffusion channel (35), and wherein a second portion (53) of the cushion is disposed in a folded state in an enclosure (57, 77) demarcated by at least a portion of the inner casing (23), the front portion of the outer cover (17) and a portion of the vehicle roof header (29);
   wherein the weakened area (45) of the outer cover (17) is disposed close to an end of the diffusion channel (35) and wherein the front portion of the outer cover includes hinge means for facilitating deployment of the cushion when the weakened area has broken.

2. An airbag according to claim 1, which further comprises a sleeve (47) made of a flexible material for protecting the cushion (11).

3. An airbag according to claim 1, characterized in that the inner casing (23) also includes a prefixing means (59) on the roof header (29), separated from the fixing area (31).

4. An airbag according to claims 1, wherein the diffusion channel (35) is located close and parallel to the roof header (29), and the outer cover (17) includes two portions (71, 73) separated by the weakened area (45), a larger portion (73) being the portion of the outer cover (17) demarcating the enclosure (77).

5. An airbag according to claim 1, wherein the outer cover (17) is fixed to the inner casing (23).

6. An airbag according to claim 1, wherein the outer cover (17) is part of a roof headliner (19) of the vehicle.

7. An airbag according to claim 1, wherein the airbag is located between the vehicle roof header (29) and a windshield (61) of the vehicle, and the diffusion channel (35) is positioned such that in a deployed state, the cushion (11) is disposed between the occupant (15), the windshield (61) and a dashboard (63) of the vehicle.

\* \* \* \* \*